(12) United States Patent
Mikhalenkov

(10) Patent No.: US 8,928,806 B2
(45) Date of Patent: Jan. 6, 2015

(54) VIDEO INTERPOLATION METHOD AND APPARATUS WITH SMOOTH FALLBACK INTERPOLATION MODE

(75) Inventor: Alexandre Mikhalenkov, Paris (FR)

(73) Assignee: Zoran (France) S.A., Neuilly-sur-Seine (FR)

( * ) Notice: Subject to any disclaimer, the term of this patent is extended or adjusted under 35 U.S.C. 154(b) by 16 days.

(21) Appl. No.: 13/634,674

(22) PCT Filed: Nov. 19, 2010

(86) PCT No.: PCT/EP2010/067849
§ 371 (c)(1),
(2), (4) Date: Sep. 13, 2012

(87) PCT Pub. No.: WO2011/113500
PCT Pub. Date: Sep. 22, 2011

(65) Prior Publication Data
US 2013/0002947 A1    Jan. 3, 2013

Related U.S. Application Data

(60) Provisional application No. 61/313,950, filed on Mar. 15, 2010.

(51) Int. Cl.
*H04N 7/01*    (2006.01)
(52) U.S. Cl.
CPC .............. *H04N 7/1027* (2013.01); *H04N 7/014* (2013.01)
USPC .......................................... 348/443; 348/538
(58) Field of Classification Search
CPC ....................................................... H04N 7/0135
See application file for complete search history.

(56) References Cited

U.S. PATENT DOCUMENTS

| 2004/0252759 | A1 | 12/2004 | John Winder et al. |
| 2009/0219438 | A1* | 9/2009 | Muto ............................. 348/441 |
| 2010/0013989 | A1 | 1/2010 | Zhou et al. |
| 2011/0311163 | A1 | 12/2011 | Bruna Estrach |

FOREIGN PATENT DOCUMENTS

| EP | 1931145 A1 | 6/2008 |
| WO | 2009087493 A1 | 7/2009 |

OTHER PUBLICATIONS

"Stereo pairs from linear morphing" by David F. McAllister, Multimedia Lab, Department of Computer Science, North Carolina State University, pp. 46-52.
"Implementation Issues in Interactive Stereo Systems," Louis Harrison, David F. McAllister, Chapter 7, pp. 138-147, ISBN: 0-691-08741-5.
International Search Report for PCT/EP2010/067849 dated Aug. 4, 2011.

* cited by examiner

*Primary Examiner* — Jefferey Harold
*Assistant Examiner* — Samira Monshi
(74) *Attorney, Agent, or Firm* — Vorys, Sater, Seymour and Pease LLP; Vincent M DeLuca

(57) ABSTRACT

Evolution of a scene represented in a video sequence of input frames is analyzed. Output pixels of an output frame having a time position intermediate between time positions of the input frames are computed by combining respective input pixels of the input frames. At least three interpolation modes are provided for computing the output pixels, including (i) a first mode in which the combined input pixels for an output pixel are selected based on a position of the output pixel in the output frame and a default interpolation vector, (ii) a second mode in which the combined input pixels are selected based on the output pixel position and at least one first interpolation vector determined for the output pixel when analyzing scene evolution, and (iii) a third mode in which the combined input pixels are selected based on the output pixel position and at least one second interpolation vector that is intermediate between the default interpolation vector and a respective first interpolation vector determined for the output pixel when analyzing scene evolution.

16 Claims, 3 Drawing Sheets

VIDEO INTERPOLATION METHOD AND APPARATUS WITH SMOOTH FALLBACK INTERPOLATION MODE

BACKGROUND OF THE INVENTION

The present invention relates to interpolation methods used in digital video signal processing, in particular in frame rate conversion (FRC) applications.

In video processing products using FRC, an input stream of video frames is received with a certain time sampling rate. The FRC process converts such input stream of "original frames" into an output stream having a different time sampling rate, including "interpolated frames" with intermediate time positions, i.e. falling between time positions of the original frames.

Every pixel of the interpolated frames is typically computed as a combination of pixels from the original frames, following a motion vector or direction of invariance determined by analyzing the input stream. More generally, the combination of pixels can make use of one or more interpolation vectors identified by analyzing the evolution of the scene in the video sequence.

Several combination modes can be provided for the interpolation and selected depending on a context determined when analyzing the input stream. In particular, a "fallback mode" for combining the original pixels is sometimes available in the FRC process, which is different from the general operation mode. The fallback mode discards most of the information about the scene (such as object motions, for instance) and performs the interpolation by simply blending pixel values of original frames at the same location as the computed pixel. This amounts to doing an interpolation along a zero motion.

The fallback mode is often used on scenes or parts of scenes which are too complex for the general operation mode to interpolate correctly. In other words, it is used where the FRC engine decides that it is better to leave motion blur or judder instead of introducing unnatural artifacts that will catch the viewer's eye.

Switching between the general operation mode and the fallback mode is very noticeable because it often affects large portions of the image. Although the actual difference between the results of the two modes may be small, the fact of switching can be easily perceived by the final viewer as a sudden jump in the output video sequence. If such a switching happens often and/or for large portions of the image, it can be easily pointed out by the final user as an important artifact of the video processing product using the FRC process.

There is thus a need for interpolation methods with a reduced impact of jumping artifacts.

A video interpolation method is proposed, comprising: analyzing evolution of a scene represented in a video sequence of input frames; and computing output pixels of an output frame having a time position intermediate between time positions of the input frames, by combining respective input pixels of the input frames. At least three interpolation modes are provided for computing the output pixels. The interpolation modes include:

a first mode in which the combined input pixels for an output pixel are selected based on a position of the output pixel in the output frame and a default interpolation vector;

a second mode in which the combined input pixels are selected based on the output pixel position and at least one first interpolation vector determined for the output pixel when analyzing scene evolution; and a third mode in which the combined input pixels are selected based on the output pixel position and at least one second interpolation vector that is intermediate between the default interpolation vector and a respective first interpolation vector determined for the output pixel when analyzing scene evolution.

The second mode is a general operation mode based on motion detection or another kind of scene evolution analysis performed in the analysis step, while the first mode is a fallback mode used when the results of the scene analysis are not considered reliable. The third mode uses intermediate interpolation vectors to provide smooth transitions in intermediate situations in a way which corresponds naturally to the properties of the human vision. It is available to avoid jumping artifacts when switching between the general mode and the fallback mode.

In the third mode, the amplitude of the interpolation vectors is gradually changed, which is a much better solution than a simple linear blending between pixels values respectively obtained by the general operation mode and the fallback mode. Human vision acts in such a way that as soon as the fallback mode solution becomes "visible" (i.e. has an interpolation weight substantially different from zero in a linear blending method), it is perceived as a separate scene despite its relative transparency. Thus, blending pixels values alters the smooth transition effect and fails to provide the expected visual result.

The third interpolation mode is typically selected for an output pixel position in a transition phase between use of the first mode and use of the second mode or vice versa for computing output pixels at an output pixel position in successive output frames. The third mode can also be used when the reliability of the scene analysis is degraded but not to the point of switching to the fallback mode. Different ways of handling the transition phases can be implemented.

In an embodiment, a transition degree is determined for an output pixel, and the interpolation mode is selected for said output pixel based on the transition degree. In such a case, when the third interpolation mode is selected for the output pixel, the second interpolation vector may be determined as a function of the transition degree.

In particular, the transition degree can be 0 for the first interpolation mode, 1 for the second interpolation mode and a number between 0 and 1 for the third interpolation mode. For example, when the third interpolation mode is selected for the output pixel, each second interpolation vector may be determined as $(v_x, v_y) = (v_x^D, v_y^D) + \beta \cdot [(v_{0x}, v_{0y}) - (v_x^D, v_y^D)]$, where $(v_x^D, v_y^D)$ is the default interpolation vector and $(v_{0x}, v_{0y})$ is a respective first interpolation vector determined for the output pixel when analyzing scene evolution and $\beta$ denotes the transition degree ($0 \leq \beta \leq 1$). Alternatively, the second interpolation vector can be $(v_x, v_y) = (v_x^D, v_y^D) + \text{Min}\{1, \beta \cdot v_x^M/|v_{0x}|, \beta \cdot v_y^M/|v_{0y}|\} \cdot [(v_{0x}, v_{0y}) - (v_x^D, v_y^D)]$ when the third interpolation mode is selected for the output pixel, where $v_{0x}$ and $v_{0y}$ are coordinates of said first interpolation vector along two directions of the frames, $v_x^M$ and $v_y^M$ are preset positive parameters, and $\text{Min}(a,b,c)$ represents the smallest of three numbers a, b, c.

In an implementation of the interpolation method, determining a transition degree for an output pixel comprises:

obtaining confidence data relating to the first interpolation vectors determined for pixels at the output pixel position in successive output frames; and analyzing time evolution of the confidence data to obtain the transition degree for the output pixel in a current output frame.

In a typical non exclusive embodiment, the first interpolation vectors are motion vectors determined for the output pixels by analyzing motion in the step of analyzing evolution of the scene represented in the video sequence. A possibility for the default interpolation vector used in the first and third modes is to take it as a zero motion vector.

Another aspect of the invention relates to a video interpolation apparatus, comprising:
a scene evolution analyzer for analyzing evolution of a scene represented in a video sequence of input frames; and
an interpolator for computing output pixels of an output frame having a time position intermediate between time positions of the input frames, by combining respective input pixels of the input frames. At least three interpolation modes are provided for computing the output pixels, including the above-mentioned first, second and third modes.

Other features and advantages of the method and apparatus disclosed herein will become apparent from the following description of non-limiting embodiments, with reference to the appended drawings.

DESCRIPTION OF PREFERRED EMBODIMENTS

Figure 1:
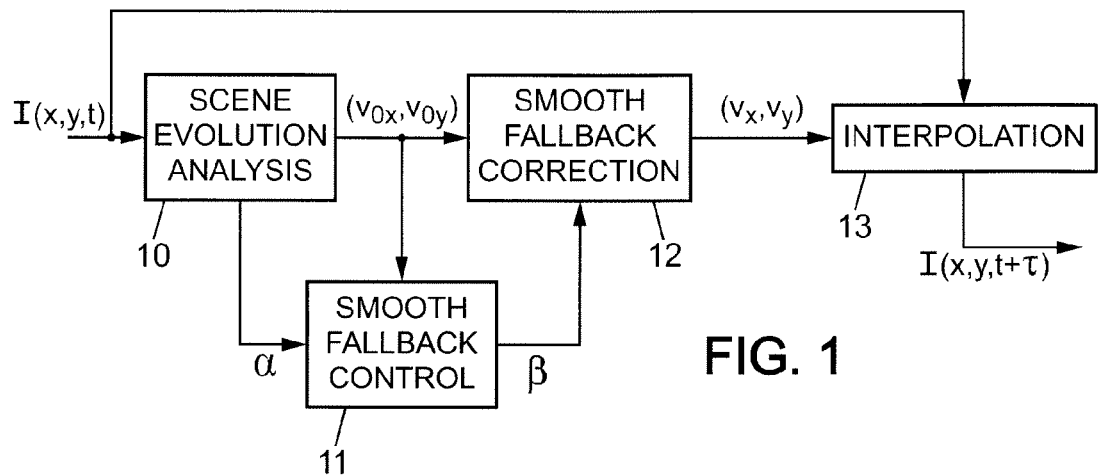
FIG. 1 is a block diagram of an FRC apparatus implementing different interpolation modes.

The apparatus represented in FIG. 1 processes a video sequence of input frames and produces an output video sequence including interpolated frames. The frame rate is changed between the input sequence and the output sequence. The timing of the input sequence is represented by integers t, t+1, etc., while some output frames have intermediate time positions t+τ with 0<τ<1 due to conversion of the frame rate. The pixel values of these intermediate frames are interpolated by combining certain pixels values of input frames having relatively close positions in time. For example, pixels of an output frame at t+τ are computed from pixels of input frames at t and t+1 or, more generally from n pixels of input frames at integer times $t_1, t_2, \ldots, t_n$ with $n \geq 1$ and $t-m < t_1 \leq t_2 \leq \ldots \leq t_n \leq t+m$ for some integer m.

Only one value per pixel is considered in the following explanations (red color channel, for instance). However, it will be appreciated that the same mechanism can be applied to all channels.

The choice of the pixels to be combined, as well as the way they are combined, depend on the contents of the closest original frames, the spatial coordinates (x, y) of the interpolated pixel, the time position of the interpolated frame (τ), and possibly other factors (such as global cadence phase, general information about the scene type, etc.).

In the following, the notation I(x, y, t+τ) represents the value of a pixel at spatial coordinates (x, y) and at a time position t+τ with t integer and 0≤τ<1. It can represent a value of an original pixel from an input frame (τ=0), or a value of an interpolated pixel of an output frame otherwise (0<τ<1).

An output pixel of an interpolated frame is computed by a combination such as:

$$I(x,y,t+\tau) = F_{x,y,t,\tau}[I(x_1,y_1,t_1), I(x_2,y_2,t_2), \ldots, I(x_n,y_n,t_n)] \quad (1)$$

where $(x_i, y_i)$ denote the spatial coordinates of a pixel of an input frame at time $t_i$ which contributes to the combination, and $F_{x,y,t,\tau}$ is an interpolation function having n pixel values as arguments. The function $F_{x,y,t,\tau}$ can be different for every interpolated output pixel. Both spatial and temporal coordinates of the contributing pixels $(x_i, y_i, t_i)$ can be different for every interpolated pixel as well.

Figure 2:
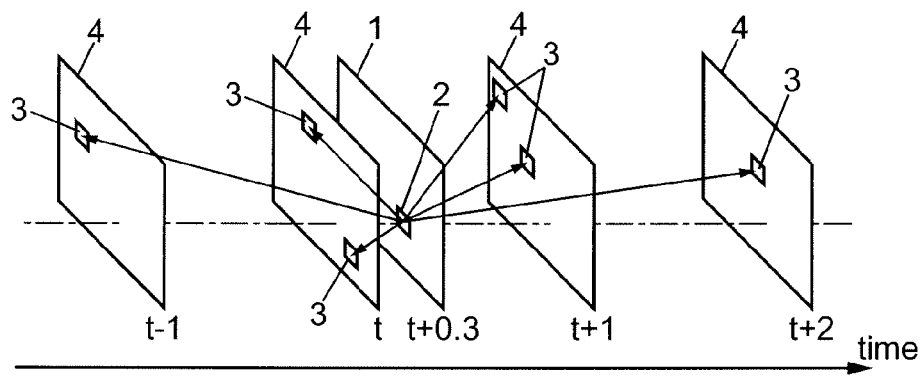
FIG. 2 is a diagram illustrating a general operation mode for interpolating pixels of successive frames.

FIG. 2 shows an example of the combination for a general interpolation mode. In this example, the interpolated frame 1 is located at the moment t+τ=t+0.3, and the interpolated output pixel 2 is obtained by combining values of six different pixels 3 from four different input frames 4 at times $t_1=t-1$, $t_2=t_3=t$, $t_4=t_5=t+1$, $t_6=t+2$.

The interpolation function $F_{x,y,t,\tau}$ and the space and time coordinates of the contributing pixels are referred to as an "interpolation set" $\{F_{x,y,t,\tau}, x_1, y_1, t_1, \ldots, x_n, y_n, t_n\}$. A respective interpolation set is determined for each pixel of the interpolated frame.

The interpolation function $F_{x,y,t,\tau}$ is often a simple linear combination, i.e. a weighted sum of its arguments:

$$I(x,y,t+\tau) = p_1(x,y,t,\tau) \cdot I(x_1,y_1,t_1) + \ldots + p_n(x,y,t,\tau) \cdot I(x_n,y_n,t_n) \quad (2)$$

using n weights $p_i(x, y, t, \tau)$ such that $$\sum_{i=1}^{n} p_i(x, y, t, \tau) = 1.$$

For example, in directional interpolation, the linear blending is performed along a single direction which corresponds to a motion vector $(v_x, v_y)$ detected at the current point (x, y, t+τ). The interpolated pixel value can be a weighted sum of only two pixels, the first one taken from the adjacent original frame in the past, and the second one from the adjacent original frame in the future. In terms of equation (2), n=2, $t_1=t$, $t_2=t+1$. So, equation (2) may be reduced to:

$$I(x,y,t+\tau) = F^d[x,y,t,\tau,v_x,v_y] = p_1(x,y,t,\tau) \cdot I(x-v_x\tau,y-v_y\tau,t) + p_2(x,y,t,\tau) \cdot I(x+v_x(1-\tau),y+v_y(1-\tau),t+1) \quad (3)$$

In their simplest form, the relative weights $p_1(x, y, t, \tau)$, $p_2(x, y, t, \tau)$ of the two pixels are given by the temporal distance between the interpolated frame and the corresponding original frames, i.e. $p_1(x, y, t, \tau) = 1-\tau$ and $p_2(x, y, t, \tau) = \tau$. In order to take into account occlusion information, it can be useful to apply different relative weights, e.g. $(p_1, p_2) = (1, 0)$ or (0, 1), in an occluded or disoccluded zone depending on object motion (see, for example, international patent application No. PCT/EP2010/050744).

In certain applications, directional interpolations along a number q>1 of motion vectors $(v_{x,1}, v_{y,1}), \ldots, (v_{x,q}, v_{y,q})$ can be blended at the same point:

$$I(x,y,t+\tau) = F_1^d[x,y,\tau,v_{x,1},v_{y,1}] + \ldots + F_q^d[x,y,\tau,v_{x,q},v_{y,q}] \quad (4)$$

The determination of one or more interpolation vectors, and possibly of some other information, for each interpolated output pixel involves analysis of the evolution of the scene represented in the input video sequence. Such analysis makes it possible to determine an interpolation set $\{F_{x,y,t,\tau}, x_1, y_1, t_1, \ldots, x_n, y_n, t_n\}$ for each output pixel $(x, y, t+\tau)$ of an interpolated frame.

In certain instances, the determined interpolation set $\{F_{x,y,t,\tau}, x_1, t_1, \ldots, x_n, y_n, t_n\}$ may be simply expressed as one or more motion vectors $(v_{0x}, v_{0y})$ representing the local displacement of an object to which the pixel $(x, y, t+\tau)$ is expected to belong in the scene. Different known means can be applied to determine such motion vectors (see, among others, WO 2009/087493 or the above-mentioned application No. PCT/EP2010/050744). The present interpolation method is not dependent on the details of the specific scene evolution analysis scheme which is applied.

In the embodiment illustrated in FIG. 1, the scene evolution analyzer 10 provides an interpolation vector $(v_{0x}, v_{0y})$ for each output pixel $(x, y, t+\tau)$. It may also provide associated confidence data $\alpha$. The confidence data $\alpha$ may consist of a vector or scalar value typically derived from the minimum value of a cost function which is minimized in the scene evolution analysis.

For example, the analyzer 10 may perform motion detection using the well-known block matching technique. Detecting the motion at $(x, y, t+\tau)$ then consists in minimizing a matching energy $E_{x,y,t+\tau}(v_x, v_y)$ over a window W which is a set of offsets $d=(d_x, d_y)$. A possible form of the matching energy is the Euclidean distance $$E_{x,y,t+\tau}(v_x, v_y) = \sum_{d \in W} |I(x + d_x, y + d_y, t) - I(x + d_x + v_x, y + d_y + v_y, t + 1)|^2.$$

Then, we can take $$(v_{0x}, v_{0y}) = \underset{(v_x, v_y) \in \Omega}{\operatorname{argmin}} \{E_{x,y,t+\tau}(v_x, v_y)\}$$

As the detected motion vector at $(x, y, t+\tau)$, where the minimization is over a predefined set of candidate vectors $\Omega$. If the confidence data $\alpha$ is expressed as a scalar value, it may be computed as a function of $E_{x,y,t+\tau}(v_{0x}, v_{0y})$, for example normalized with respect to the signal energy in the local window, i.e. $\alpha$ being proportional to $$\lambda = \frac{E_{x,y,t+\tau}(v_{0x}, v_{0y})}{\sum_{d \in W} |I(x + d_x, y + d_y, t)|^2}.$$

The confidence data $\alpha$ may be determined by a thresholding operation based on $E_{x,y,t+\tau}(v_{0x}, v_{0y})$ or $\lambda$, for example $\alpha=0$ (low confidence) if the threshold is exceeded and $\alpha=1$ (high confidence) if $E_{x,y,t+\tau}(v_{0x}, v_{0y})$ or $\lambda$ is below the threshold. The confidence data $\alpha$ may further take other discrete values between 0 and 1 if multiple thresholds are used, the higher values of $\alpha$ meaning higher confidence levels in the motion detection.

In the embodiment illustrated in FIG. 1, the confidence data $\alpha$ are provided to a smooth fallback controller 11 which determines a transition degree $\beta$ for the current output pixel $(x, y, t+\tau)$. The smooth fallback controller 11 may carry out the above-mentioned normalization and/or thresholding operations if they are not implemented in the scene evolution analyzer 10. It may also perform some other operations as described further below.

Based on the transition degree $\beta$, a correction may be applied to the interpolation vector $(v_{0x}, v_{0y})$ detected for the current output pixel by a smooth fallback correction module 12. After the correction, if any, an interpolation vector provided to the interpolator 13 is noted $(v_x, v_y)$. From this vector, the interpolator 13 performs directional interpolation, for example according to (3), to obtain an interpolated value for the output pixel $(x, y, t+\tau)$. If more than one interpolation vector are provided, multidirectional interpolation according to (4) may be applied, or a more general interpolation scheme according to (1) or (2).

In the general operation mode illustrated in FIG. 2, no correction of the interpolation vector(s) is applied by the module 12. The transition degree $\beta$ is then equal to 1, and we have $(v_x, v_y)=\beta \cdot (v_{0x}, v_{0y})=(v_{0x}, v_{0y})$ for each interpolation vector determined by the analyzer 10.

Figure 3:
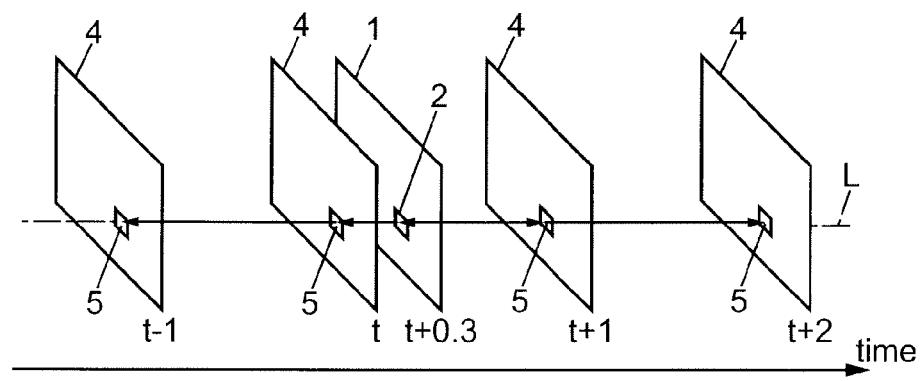
FIG. 3 is a diagram similar to that of FIG. 2, illustrating a fallback interpolation mode.

Another interpolation mode of the FRC apparatus is the fallback mode, of which an embodiment is illustrated in FIG. 3. In the fallback interpolation mode, most of the information about the scene (such as object motions) is discarded and the interpolation is performed without or with very little dependence on the frame content, compared to the general operation mode. The interpolation is performed by replacing the interpolation vector(s) $(v_{0x}, v_{0y})$ detected for the current output pixel by a default interpolation vector $(v_x^D, v_y^D)$. In the fallback mode, the transition degree $\beta$ is 0.

The default interpolation vector may be chosen by different ways. A possibility is to obtain it using, locally or globally, another scheme for analyzing scene evolution. In an embodiment considered more particularly in the following, it is simply taken as a zero motion vector, namely $(v_x^D, v_y^D)=(0, 0)$. In this case, the interpolated pixel 2 combines only the values of the pixels from the temporally close input frames which have the same spatial coordinates $(x, y)$ as the interpolated pixel itself. Those input pixels are aligned on a fallback direction line L which goes through the current output pixel 2.

In this case, the general interpolation equation (1) is modified as follows:

$$I(x,y,t+\tau)=F_{x,y,t,\tau}[I(x,y,t_1),I(x,y,t_2), \ldots, I(x,y,t_n)] \quad (5)$$

The choice of the interpolation mode can be made independently for each interpolated pixel. However, quite often, large portions of the image or even whole frames change the interpolation mode simultaneously.

The original pixelwise choice of the interpolation sets, performed by the scene evolution analyzer 10, may also be changed by the module 12 in another interpolation mode referred to as "smooth fallback" mode. In the illustrated embodiment, the smooth fallback mode corresponds to $0<\beta<1$. Each vector $(v_{0x}, v_{0y})$ determined for an output pixel by the scene evolution analyzer 10 can then be replaced by a smoothed interpolation vector $(v_x, v_y)$, for example $(v_x, v_y)=(v_x^D,v_y^D)+\beta \cdot [(v_{0x}, v_{0y})-(v_x^D,v_y^D)]$, which simply reduces the amplitude of the interpolation vector in proportion to $\beta$ when $(v_x^D,v_y^D)=(0, 0)$, i.e. $(v_x, v_y)=\beta \cdot (v_{0x}, v_{0y})$.

The smooth fallback controller 11 provides smooth fallback control data to the smooth fallback correction module 12. These data define what transition degree should be applied to the given image, portion of image, or individual pixels, and possibly certain classes of the interpolation sets. For instance, one may decide to apply the smooth fallback correction only to the interpolation sets corresponding to the objects having a film frame repetition cadence, but not to those having a video frame repetition cadence. Alternatively, such correction may be applied only to the interpolation sets which are considered doubtful for some reason. Information about such doubtful interpolation sets may be provided directly by the scene evolution analyzer 10 or may be computed as a function of properties of the interpolation set by the smooth fallback controller 11.

For a given transition degree β, the original interpolation set may be modified as follows:
the original combination function F is preserved;
the number of contributing pixels, as well as their time positions, also remain unchanged;
however, their spatial coordinates are modified in such a way that their distances to the "fallback" coordinates are reduced in proportion to the transition degree β.

In this case, the general interpolation equation (1) is modified as follows:

$$I(x,y,t+\tau)=F_{x,y,t,\tau}[I(x+\beta_1 \cdot (x_1-x),y+\beta_1 \cdot (y_1-y),t_1),\ldots,I(x+\beta_n \cdot (x_n-x),y+\beta_n \cdot (y_n-y),t_n)] \quad (6)$$

for coefficients $\beta_1, \beta_2, \ldots \beta_n$ lying between 0 and 1.

In the simple case of directional interpolation with one motion vector $(v_{0x}, v_{0y})$, relative weights given by the temporal distance between the interpolated frame and the corresponding original frames and $(v_x^D, v_y^D)=(0,0)$, equation (6) for the smooth fallback mode is reduced to:

$$I(x,y,t+\tau)=(1-\tau)\cdot I(x-\beta_1 \cdot v_{0x} \cdot \tau, y-\beta_1 \cdot v_{0y} \cdot \tau, t)+\tau \cdot I(x+\beta_2 \cdot v_{0x} \cdot (1-\tau), y+\beta_2 \cdot v_{0y} \cdot (1-\tau), t+1) \quad (7)$$

In other words, the originally detected motion vector $(v_{0x}, v_{0y})$ has its amplitude reduced to be replaced by $(v_x, v_y)=\beta_1 \cdot (v_{0x}, v_{0y})$ for frame t and $(v_x, v_y)=\beta_2 \cdot (v_{0x}, v_{0y})$ for frame t+1. The coefficients $\beta_1, \beta_2$ for the same motion vector $(v_{0x}, v_{0y})$ are typically equal.

The coefficients $\beta_i$ which control the transition level can be different for every contributing pixel, as defined by the smooth fallback control data. In an embodiment, these coefficients are all equal to the transition degree β determined by the smooth fallback controller 11: $\beta_1 = \ldots = \beta_n = \beta$. For $\beta_1 = \ldots = \beta_n = 1$, the general interpolation mode is applied. For $\beta_1 = \ldots = \beta_n = 0$, the fallback interpolation mode is applied. Intermediate $\beta_i$ values correspond to the smooth fallback mode.

Figure 4:
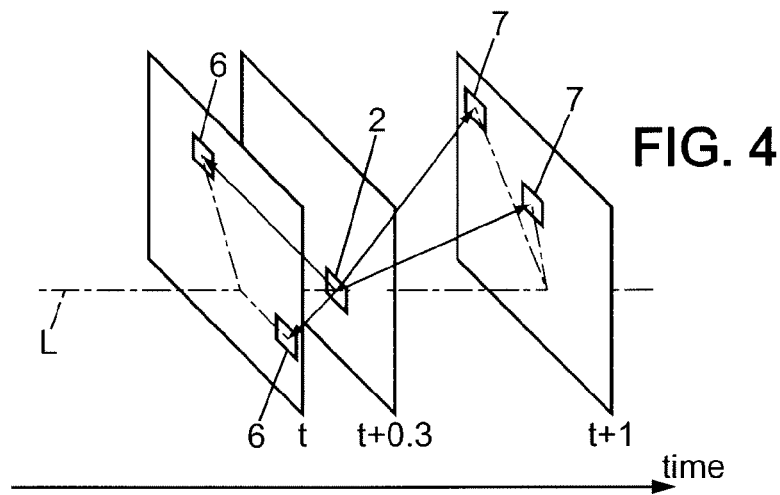
FIGS. 4 and 5 are diagrams illustrating, on another example, the general operation mode and a so-called smooth fallback interpolation mode, respectively.
Figure 5:
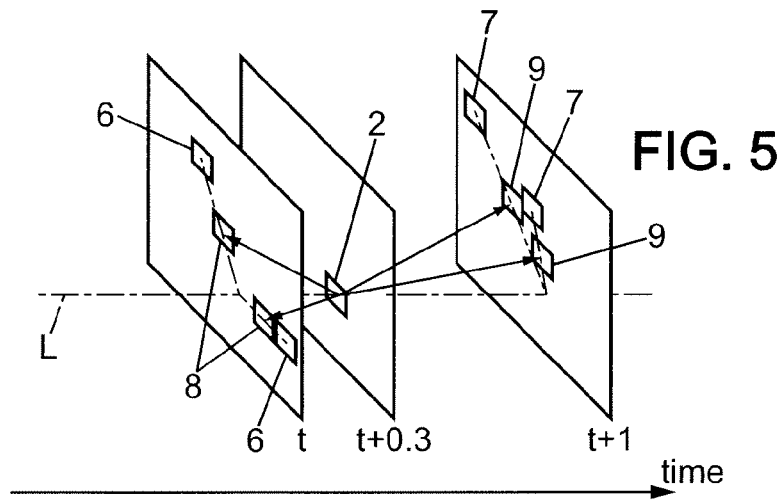

FIGS. 4 and 5 provide an illustration of a smooth fallback modification of the spatial coordinates of the contributing pixels of the interpolation set, with $(v_x^D, v_y^D)=(0,0)$. FIG. 4 shows an example of an original interpolation set with four contributing pixels, two (6) in a past frame (at t), and two (7) in a future frame (at t+1). The original interpolation set corresponds to a general interpolation mode, i.e. β=1. FIG. 5 shows the same interpolation set modified by factor β=0.5. It is seen that the contributing pixels 8, 9 are now two times closer to the fallback direction line L than they were in the unmodified interpolation set.

When the interpolation mode is to be changed from general (FIG. 2) to fallback (FIG. 3) [or vice versa] for an object, a portion of the image or the whole frame, the smooth fallback mode can be used for the areas in question during several output frames, with a decreasing [or increasing] transition degree β.

The duration of the transition, as well as the time profiles of the transition functions $\beta_i(t+\tau)$ can be configured by the fallback controller 11. For example, the degrees of transition $\beta_i$ can be the same for all the contributing pixels 6, 7, as shown in FIGS. 4-5: $\beta_i(t+\tau)=\beta(t+\tau)$. In this case, all the interpolation vectors used during the transition from general mode to fallback mode converge with the same relative speed to the default interpolation vector corresponding to the fallback solution.

The coefficients $\beta_i(t+\tau)$ can also depend on the magnitude of the interpolation vectors $(v_{0x}, v_{0y})$ originally determined for the output pixel by the scene evolution analyzer 10. For instance, the vectors can be clamped gradually, starting from the largest ones. In this case, at the end all interpolation vectors converge to the fallback solution with the same absolute speed.

$$\beta_i = \text{Min}\{1, \beta \cdot R_0 / \|(v_{0x}, v_{0y})\|\} \quad (8)$$

where $R_0$ is a preset clamping radius and $\|(v_{0x}, v_{0y})\|$ some norm for the interpolation vector, e.g. $\|(v_{0x}, v_{0y})\| = \max\{v_{0x}, v_{0y}\}$ or $\sqrt{v_{0x}^2 + v_{0y}^2}$.

Figure 6:
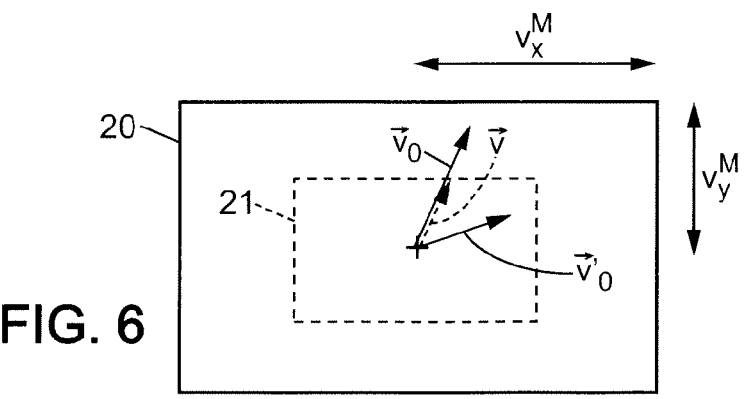
FIG. 6 is a diagram illustrating one way of clipping motion vectors in an embodiment of the interpolation method.

Reference can also be made to a rectangle 20 whose maximum dimensions along the spatial directions x and y are equal to $2 \cdot v_x^M$ and $2 \cdot v_y^M$, respectively, as shown in FIG. 6. The size of the rectangle 20 is reduced in proportion to β to give a smaller rectangle 21 and the interpolation vector is clamped in the smooth fallback mode to be inside the smaller rectangle 21 (e.g. $\vec{v}_0$ becomes $\vec{v}$ in FIG. 6 while $\vec{v}'_0$ is unchanged. Then, the amplitude reduction coefficients $\beta_i$ are given by:

$$\beta_i = \text{Min}\{1, \beta \cdot v_x^M/|v_{0x}|, \beta \cdot v_y^M/|v_{0y}|\} \quad (9)$$

The parameters $v_x^M$, $v_y^M$ may correspond to upper bounds of the coordinates of the candidate vectors of the set Ω as used by the scene evolution analyzer 10.

The interpolation can, for example, be performed as:

$$(v_x, v_y) = (v_x^D, v_y^D) + \text{Min}\{1, \beta \cdot v_x^M/|v_{0x}|, \beta \cdot v_y^M/|v_{0y}|\} \cdot [(v_{0x}, v_{0y}) - v_x^D, v_y^D)] \quad (9')$$

if default interpolation vectors $(v_x^D, v_y^D)$ other than zero are available.

The evolution in time of the transition degree β(t) for a given output pixel position can have various forms. Typically, it is a simple monotonous function which satisfies border conditions such as $\beta(t_{fallback})=0$, $\beta(t_{general\_FRC})=1$, where $t_{fallback}$ is a frame time at which the fallback mode has been selected for the pixel being considered and $t_{general\_FRC}$ is a time at which the general operation mode has been selected for that pixel.

It is also possible to configure the evolution in time of the transition degree β(t) in a way that takes into account other parameters, such as system state history. This allows creating systems with hysteresis and/or systems with different transition reactivity and speed depending on whether the FRC engine switches from general interpolation mode to the fallback mode or vice versa.

This allows to perform visually smooth FRC/fallback transitions, as well as to mask to a certain extent fallback transitions of short duration.

In an embodiment, the transition degree β(t) for a given pixel is obtained by analyzing the time evolution of the confidence data α determined for the pixel in question. For example, β(t) may be determined by low-pass filtering in time, e.g. as an average of $\alpha(t-q), \ldots, \alpha(t-1), \alpha(t)$ for some integer q. Hence, when α=1 for a few frames (stable high confidence in the interpolation vectors), β=1 and the general operation mode is selected, while when α=0 for a few frames (lingering low confidence in the interpolation vectors), β=0 and the fallback mode is selected. In intermediate situation (fluctuating confidence), the smooth fallback mode is selected (0<β<1).

The transition degree β may also be filtered spatially for more regularity over the frame.

Figure 9:
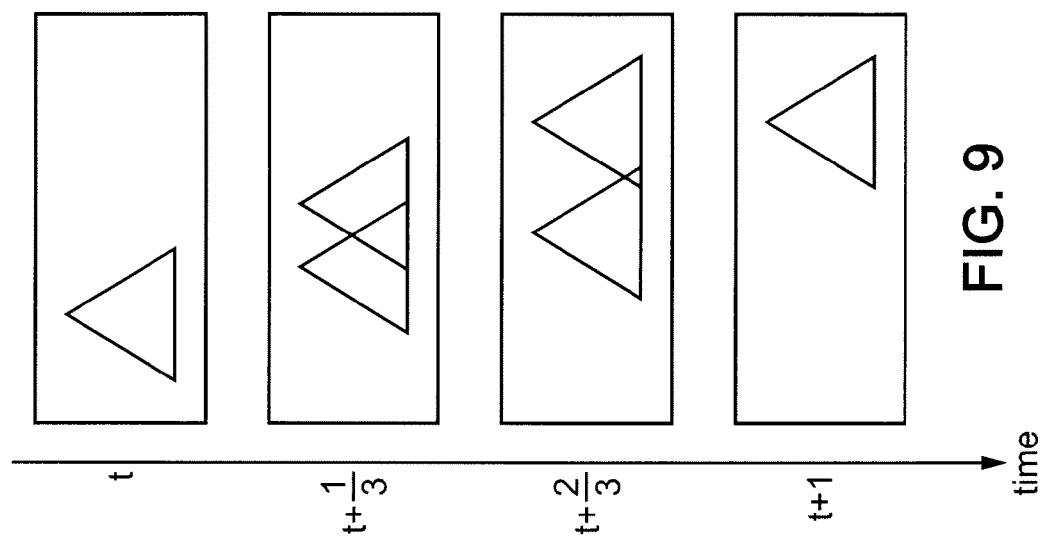
FIGS. 7-9 show frames interpolated by means of three different video interpolation methods.
Figure 8:
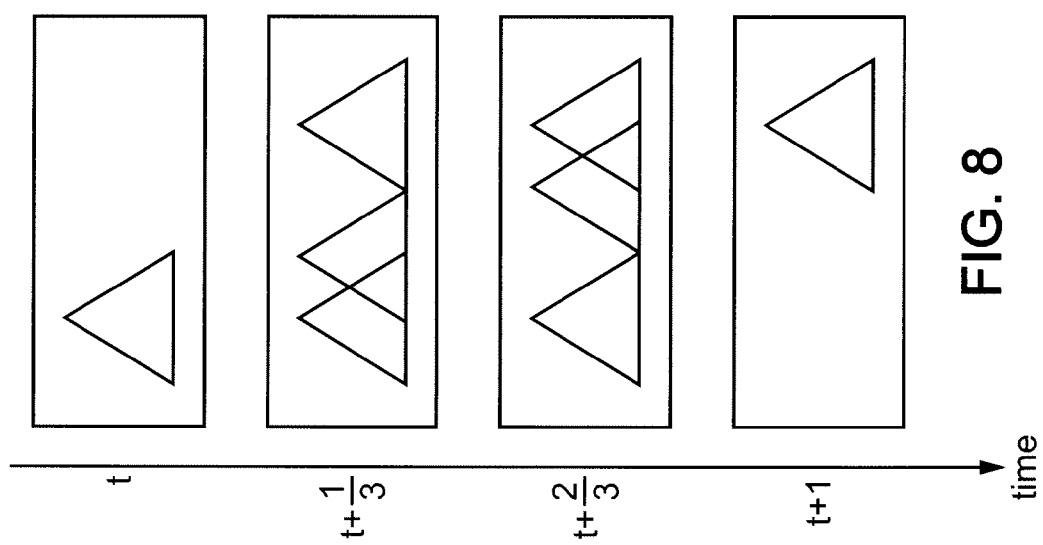
Figure 7:
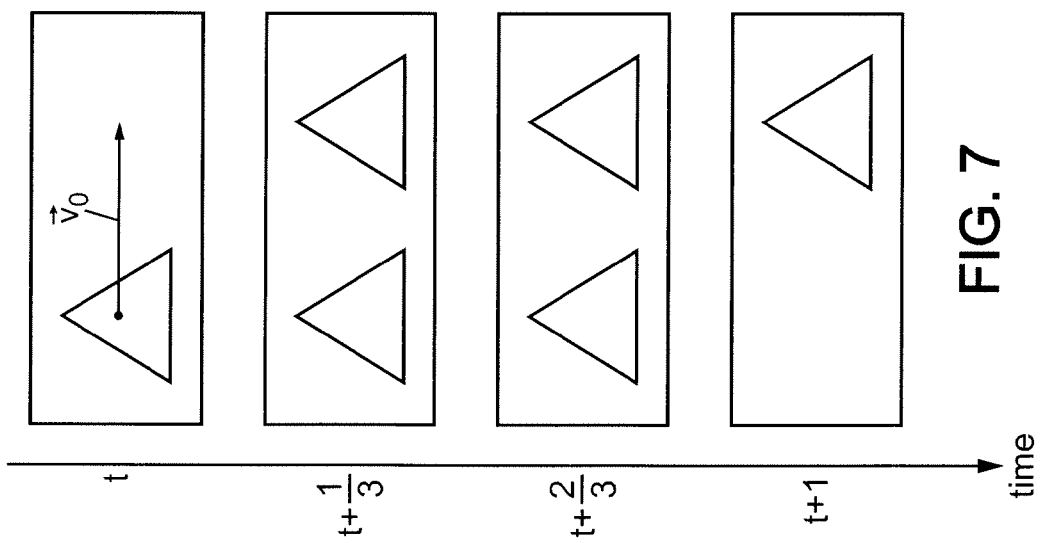

FIGS. 7-9 help understanding the effect obtained by the above-described method. An object (here, a triangle) is supposed to move horizontally at a certain speed. In the input frames at times t and t+1, the triangle appears in the spatial positions shown in the upper and lower frames depicted in FIGS. 7-9 and, in this case, the scene evolution analyzer 10 finds a motion vector $\vec{v}_0=(v_{0x}, 0)$ for the pixels of the triangle. If the general operation mode is selected, each intervening frame, in the example at times t+⅓ and t+⅔, includes the image of a single triangle shifted horizontally by $(v_{0x}/3, 0)$ and $(2 \cdot v_{0x}/3, 0)$ with respect to frame t.

However, if for some reason the interpolation mode is switched from the general FRC mode to the fallback mode after the first frame, this abrupt change would be immediately noticed, since the visual difference between the two modes of object tracking is important. Direct application of the fallback mode would provide intervening frames at t+⅓ and t+⅔ as shown in FIG. 7, with a sudden appearance of a second triangle at a relatively large distance from the first one. Such artifact is very noticeable due to the human vision ability to perform object tracking. Depending on the temporal position of the interpolated frames as well as on the exact implementation of the fallback mode, these ghost objects could be more or less transparent and more or less far from each other. The maximal tracking mismatch distance corresponds to the object frame speed, i.e. the transition is most noticeable for the fast-moving objects. Unfortunately, fallback transition often occurs for fast-moving objects and scenes, which explains why these visual artifacts are so common. The sensitivity to the artifact increases with the ability of the FRC product to track fast moving objects. So the drawback tends to occur for the more advanced FRC products.

FIG. 8 shows what would be, in the same example, the result of a solution consisting in mixing the results of two interpolations performed (i) in the general FRC mode and (ii) in the fallback mode. Another triangle (corresponding to the general FRC solution) appears in addition to the two triangles of the fallback solution, which does not prevent the objectionable jump artifact of FIG. 7.

Use of a smooth fallback transition as described above is illustrated in FIG. 9 for the same object. It provides a much more natural and progressive transition between the two visual tracking impressions. Indeed, at the first frame after the fallback decision has been taken, the transition degree β will still be fairly close to 1. Thus, the corresponding interpolation sets will provide the image of the triangle from the original frames which would be almost at the correct coordinates. This coordinate imperfection introduces a barely noticeable vibration in the tracked object, along the direction of its motion. As β is further reduced, the amplitude of this vibration, or the "tracking mismatch distance" would increase accordingly, until it reaches the object speed for β=0, in which case it will become identical to the standard fallback solution. As one can see, such a transition naturally corresponds to the way the human vision tracks moving objects. It is known that the human eye has a relatively low sensitivity to progressively increased judder.

While a detailed description of exemplary embodiments of the invention has been given above, various alternatives, modifications, and equivalents will be apparent to those skilled in the art. Therefore the above description should not be taken as limiting the scope of the invention which is defined by the appended claims.

The invention claimed is:

1. A video interpolation method, comprising:
analyzing evolution of a scene represented in a video sequence of input frames; and
computing output pixels of an output frame having a time position intermediate between time positions of the input frames, by combining respective input pixels of the input frames, wherein at least three interpolation modes are provided for computing the output pixels, the interpolation modes including:
a first mode in which the combined input pixels for an output pixel are selected based on a position of the output pixel in the output frame and a default interpolation vector;
a second mode in which said combined input pixels are selected based on said output pixel position and at least one first interpolation vector determined for the output pixel when analyzing scene evolution; and
a third mode in which said combined input pixels are selected based on said output pixel position and at least one second interpolation vector that is intermediate between the default interpolation vector and a respective first interpolation vector determined for said output pixel when analyzing scene evolution,
and wherein the method further comprises:
while one of the first and second interpolation modes is used at an output pixel position, making a decision to switch to the other one of the first and second interpolation modes, and starting a transition phase in response to said decision;
selecting the third interpolation mode at said output pixel position for computing output pixels at said output pixel position in successive output frames in said transition phase.

2. The video interpolation method as claimed in claim 1, comprising:
determining a transition degree for an output pixel; and
selecting the interpolation mode for said output pixel based on the transition degree.

3. The video interpolation method as claimed in claim 2, comprising, when the third interpolation mode is selected for said output pixel:
determining the second interpolation vector as a function of the transition degree.

4. The video interpolation method as claimed in claim 3, wherein the transition degree, noted β, is 0 for the first interpolation mode, 1 for the second interpolation mode and a number between 0 and 1 for the third interpolation mode, and wherein when the third interpolation mode is selected for said output pixel, each second interpolation vector is $(v_x, v_y) = (v_x^D, v_y^D) + \beta \cdot [(v_{0x}, v_{0y}) - (v_x^D, v_y^D)]$, where $(v_x^D, v_y^D)$ is the default interpolation vector and $(v_{0x}, v_{0y})$ is a respective first interpolation vector determined for said output pixel when analyzing scene evolution.

5. The video interpolation method as claimed in claim 3, wherein the transition degree, noted β, is 0 for the first interpolation mode, 1 for the second interpolation mode and a number between 0 and 1 for the third interpolation mode, and wherein when the third interpolation mode is selected for said output pixel, each second interpolation vector is $(v_x, v_y) = (v_x^D, v_y^D) + \mathrm{Min}\{1, \beta \cdot v_x^M / |v_{0x}|, \beta \cdot v_y^M / |v_{0y}|\} \cdot [(v_{0x}, v_{0y}) - (v_x^D, v_y^D)]$, where $(v_x^D, v_y^D)$ is the default interpolation vector, $(v_{0x}, v_{0y})$ is a respective first interpolation vector determined for said output pixel when analyzing scene evolution, having coordinates $v_{0x}$ and $v_{0y}$ along two directions of the frames, and $v_x^M$ and $v_y^M$ are preset positive parameters.

6. The video interpolation method as claimed in claim 2, wherein determining a transition degree for an output pixel comprises:
obtaining confidence data relating to the first interpolation vectors determined for pixels at said output pixel position in successive output frames; and analyzing time evolution of the confidence data to obtain the transition degree for the output pixel in a current output frame.

7. The video interpolation method as claimed in claim 1, wherein the first interpolation vectors are motion vectors determined for the output pixels by analyzing motion in the step of analyzing evolution of the scene represented in the video sequence.

8. The video interpolation method as claimed in claim 1, wherein the default interpolation vector used in the first and third modes is a zero motion vector.

9. A video interpolation apparatus, comprising:

a scene evolution analyzer for analyzing evolution of a scene represented in a video sequence of input frames; and an interpolator for computing output pixels of an output frame having a time position intermediate between time positions of the input frames, by combining respective input pixels of the input frames, wherein at least three interpolation modes are provided for computing the output pixels, the interpolation modes including:

a first mode in which the combined input pixels for an output pixel are selected based on a position of the output pixel in the output frame and a default interpolation vector;

a second mode in which said combined input pixels are selected based on said output pixel position and at least one first interpolation vector determined for the output pixel when analyzing scene evolution; and a third mode in which said combined input pixels are selected based on said output pixel position and at least one second interpolation vector that is intermediate between the default interpolation vector and a respective first interpolation vector determined for said output pixel when analyzing scene evolution, wherein the apparatus is arranged, while one of the first and second interpolation modes is used at an output pixel position, to respond to a decision to switch to the other one of the first and second interpolation modes by starting a transition phase, the third interpolation mode being selected for computing output pixels at said output pixel position in successive output frames in said transition phase.

10. The video interpolation apparatus as claimed in claim 9, comprising a transition controller for determining a transition degree for an output pixel, the interpolation mode for said output pixel being selected based on the transition degree.

11. The video interpolation apparatus as claimed in claim 10, wherein the interpolator is configured for determining the second interpolation vector as a function of the transition degree when the third interpolation mode is selected.

12. The video interpolation apparatus as claimed in claim 11, wherein the transition degree, noted $\beta$, is 0 for the first interpolation mode, 1 for the second interpolation mode and a number between 0 and 1 for the third interpolation mode, and wherein the interpolator is configured for determining each second interpolation vector as $$(v_x, v_y) = (v_x^D, v_y^D) + \beta \cdot [(v_{0x}, v_{0y}) - (v_x^D, v_y^D)]$$

when the third interpolation mode is selected, where $(v_x^D, v_y^D)$ is the default interpolation vector and $(v_{0x}, v_{0y})$ is a respective first interpolation vector determined for said pixel when analyzing scene evolution.

13. The video interpolation apparatus as claimed in claim 11, wherein the transition degree, noted $\beta$, is 0 for the first interpolation mode, 1 for the second interpolation mode and a number between 0 and 1 for the third interpolation mode, and wherein the interpolator is configured for determining each second interpolation vector as $$(v_x, v_y) = (v_x^D, v_y^D) + \mathrm{Min}\{1, \beta \cdot v_x^M / |v_{0x}|, \beta \cdot v_y^M / |v_{0y}|\} \cdot [(v_{0x}, v_{0y}) - v_x^D, v_y^D)]$$

when the third interpolation mode is selected, where $(v_x^D, v_y^D)$ is the default interpolation vector, $(v_{0x}, v_{0y})$ is a respective first interpolation vector determined for said output pixel when analyzing scene evolution, having coordinates $v_{0x}$ and $v_{0y}$ along two directions of the frames, and $v_x^M$ and $v_y^M$ are preset positive parameters.

14. The video interpolation apparatus as claimed in claim 10, wherein the scene evolution analyzer is arranged for obtaining confidence data relating to the first interpolation vectors determined for pixels at an output pixel position in successive output frames, and wherein the transition controller is arranged for analyzing time evolution of the confidence data to obtain the transition degree for an output pixel at said output pixel position in a current output frame.

15. The video interpolation apparatus as claimed in claim 9, wherein the first interpolation vectors are motion vectors determined for the output pixels by scene evolution analyzer by analyzing motion in the scene represented in the video sequence.

16. The video interpolation apparatus as claimed in claim 9, wherein the default interpolation vector used in the first and third modes is a zero motion vector.

* * * * *